(12) United States Patent
Pottenger et al.

(10) Patent No.: US 8,572,071 B2
(45) Date of Patent: Oct. 29, 2013

(54) SYSTEMS AND METHODS FOR DATA TRANSFORMATION USING HIGHER ORDER LEARNING

(75) Inventors: William M. Pottenger, Hellertown, PA (US); Nikita Lytkin, Jersey City, NJ (US); Murat C. Ganiz, Uskudar (TR)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 279 days.

(21) Appl. No.: 12/797,366

(22) Filed: Jun. 9, 2010

(65) Prior Publication Data

US 2010/0312727 A1    Dec. 9, 2010

Related U.S. Application Data

(63) Continuation-in-part of application No. 12/317,134, filed on Dec. 19, 2008, now Pat. No. 8,301,768.

(60) Provisional application No. 61/185,255, filed on Jun. 9, 2009.

(51) Int. Cl.
    *G06F 17/30* (2006.01)
(52) U.S. Cl.
    USPC ............................ 707/722; 707/723; 707/731
(58) Field of Classification Search
    USPC .................... 707/722, 723, 731; 709/219, 225
    See application file for complete search history.

(56) References Cited

U.S. PATENT DOCUMENTS

| | | | |
|---|---|---|---|
| 6,901,398 B1 | 5/2005 | Horvitz et al. | |
| 7,016,908 B2 | 3/2006 | Kataoka et al. | |
| 7,117,437 B2 | 10/2006 | Chen et al. | |
| 7,174,382 B2 | 2/2007 | Ramanathan et al. | |
| 7,296,005 B2 * | 11/2007 | Minamino et al. | 706/15 |
| 7,328,216 B2 | 2/2008 | Hofmann et al. | |
| 7,337,181 B2 | 2/2008 | Horvitz | |
| 7,392,303 B2 | 6/2008 | Smith et al. | |
| 7,457,801 B2 * | 11/2008 | Liu et al. | 1/1 |
| 7,617,370 B2 | 11/2009 | Jernigan et al. | |
| 7,634,466 B2 | 12/2009 | Rose et al. | |
| 7,664,742 B2 | 2/2010 | Pettovello | |
| 7,769,804 B2 | 8/2010 | Church et al. | |
| 7,792,353 B2 * | 9/2010 | Forman et al. | 382/159 |
| 7,958,019 B2 | 6/2011 | Ahmed et al. | |

(Continued)

OTHER PUBLICATIONS

Sam Roweis; "Clustering and Tree Models"; Oct. 21, 2003; 6 pages.*

(Continued)

*Primary Examiner* — Monica Pyo
(74) *Attorney, Agent, or Firm* — Fox Rothschild LLP

(57) ABSTRACT

Disclosed is a method and apparatus for transforming data in vector form. Each vector is composed of a set of attributes that are either boolean or have been mapped to boolean form. The vectors may or may not fall into categories assigned by a subject matter expert (SME). If categories exist, the categorical labels divide the vectors into subsets. The first transformation calculates a prior probability for each attribute based on the links between attributes in each subset of the vectors. The second transformation computes a new numeric value for each attribute based on the links between attributes in each subset of the vectors. The third transformation operates on vectors that have not been categorized. Based on the automatic selection of categories from the attributes, this transformation computes a new numeric value for each attribute based on the links between attributes in each subset of the vectors.

22 Claims, 11 Drawing Sheets

(56) References Cited

U.S. PATENT DOCUMENTS

| | | | |
|---|---|---|---|
| 2002/0069056 | A1 | 6/2002 | Nofsinger |
| 2002/0078062 | A1 | 6/2002 | Kataoka et al. |
| 2003/0191828 | A1 | 10/2003 | Ramanathan et al. |
| 2003/0236861 | A1 | 12/2003 | Johnson et al. |
| 2004/0024848 | A1 | 2/2004 | Smith et al. |
| 2005/0010390 | A1* | 1/2005 | Shimohata ............... 704/5 |
| 2006/0282309 | A1 | 12/2006 | Zhang et al. |
| 2007/0168469 | A1 | 7/2007 | Church et al. |
| 2007/0211651 | A1 | 9/2007 | Ahmed et al. |
| 2008/0080393 | A1 | 4/2008 | Kaler |
| 2009/0125637 | A1 | 5/2009 | Matuszewski |
| 2009/0164475 | A1 | 6/2009 | Pottenger |
| 2009/0177728 | A1 | 7/2009 | Pottenger |
| 2009/0177757 | A1 | 7/2009 | Pottenger |

OTHER PUBLICATIONS

Bing Liu et al.; "Chapter 3: Supervised Learning"; unknown date; 161 pages.*

Murat Ganiz et al.; "Link Analysis of Higher-Order Paths in Supervised Learning Datasets", Lehigh University, dated Feb. 25, 2006, pp. 1-11.*

Ganiz et al., "Leveraging Higher Order Dependencies Between Features for Text Classification", European Conference on Machine Learning, Sep. 2009, 16 pages.

Ganiz, Murat Can, "Higher-Order Path Analysis for Supervised Machine Learning", Apr. 2008, 142 pages.

Lytkin, Nikita I., "Variance-Based Clustering Methods and Higher Order Data Transformations and Their Applications", Sep. 2009, 91 pages.

Angelova, R. et al., "Graph-based Text Classification: Learn From Your Neighbors", SIGIR '06, Aug. 2006, Seattle, USA, pp. 485-492.

Chakrabarti, S. et al., "Enhanced Hypertext Classification Using Hyper-Links", In Proceedings of ACM SIGMOD Conference, 1998, pp. 307-318.

Deerwester, S. et al., "Indexing by latent semantic analysis", Journal of the American Society for Information Science, vol. 41, No. 6, 1990, pp. 391-407.

Edmonds, P., "Choosing the word most typical in context using a lexical co-occurrence network", In Proceedings of the Thirty-fifth Annual Meeting of the Association for Computational Linguistics, 1997, pp. 507-509.

Eyheramendy, S. et al., "On the Naïve Bayes model for text categorization" In Proceedings of AISTATS 2003, 9th International Workshop on Artificial Intelligence and Statistics, 2003, 8 pages.

Ganiz, M. et al., "Detection of Interdomain Routing Anomalies Based on Higher-Order Path Analysis", Proceedings of the Sixth IEEE International Conference on Data Mining (ICDM'06), Dec. 2006, Hong Kong, China, 6 pages.

Ganiz, M. et al., "Higher order Naïve Bayes: a novel non-IID approach to text classification," IEEE Transactions on Knowledge and Data Engineering, Jul. 2011, vol. 23, No. 7, 35 pages.

Getoor, L. et al., "Link Mining: A Survey", SIGKDD Explorations, vol. 7, No. 2, 2005, pp. 3-12.

Giles, C.L. et al., "CiteSeer: An automatic citation indexing system", ACM Digital Libraries 98, 1998, Third ACM Conference on Digital Libraries, Ed. Witten, I. et al., ACM Press, New York, pp. 89-98.

Kasik, D. et al., "Data Transformations and Representations for Information Generation," Information Visualization, 2009, vol. 8, No. 4, pp. 275-285.

Kontostathis, A. and Pottenger, W. M., "A Framework for Understanding Latent Semantic Indexing (LSI) Performance", Information Processing & Management, 2006, vol. 42, No. 1, pp. 56-73.

Kontostathis, A. and Pottenger, W. M. (2003) A Framework for Understanding LSI Performance. In the Proceedings of the ACM SIGIR Workshop on Mathematical/Formal Methods in Information Retrieval, 26th Annual International SIGIR Conference, Toronto, Canada, Jul./Aug., 14 pages.

LI, S. et al., "Distributed higher order association rule mining using information extracted from textual data," SIGKDD Explorations, Jun. 2005, vol. 7, No. 1, pp. 26-35.

LI, S. et al., (2007) Mining Higher-Order Association Rules from Distributed Named Entity Databases. In the Proceedings of the IEEE International Conference on Intelligence and Security Informatics 2007 (ISI 2007), New Brunswick, NJ, May, 9 pages.

Lu, Q. et al., "Link-based Classification", Proceedings of the Twentieth international conference on machine learning (ICML-2003), Washington D.C., 2003, pp. 496-503.

Lytkin, N., "Variance-based clustering methods and higher order data transformations and their applications," Ph.D. Dissertation submitted to the Graduate School—New Brunswick, Rutgers, The State University of New Jersey, Oct. 2009, 91 pages.

MacSkassy, S.A. et al., A Brief Survey of Machine Learning Methods for Classification in Networked Data and Application to Suspicion Scoring, Workshop on Statistical Network Analysis at 23rd International Conference on Machine Learning, Pittsburgh, Pa., 2006, 11 pages.

McCALLUM, A.K. et al., "A comparison of event models for naive bayes text classification", In Working Notes of the ICMLAAAI Workshop on Learning for Text Categorization, 1998, 8 pages.

McCALLUM, A.K. et al., "Automating the construction of internet portals with machine learning", Information Retrieval, vol. 3, 2000, pp. 127-163.

Menon, V. and Pottenger, W. M. (2009) A Higher Order Collective Classifier for Detecting and Classifying Network Events. In the Proceedings of the IEEE International Conference on Intelligence and Security Informatics 2009 (ISI 2009), pp. 125-130.

Neville, J. et al., "Dependency Networks for Relational Data", Proceedings of the Fourth IEEE International Conference on Data Mining (ICDM'04), Nov. 2004, pp. 170-177, Brighton, UK.

Neville, J. et al., "Iterative Classification in Relational Data", In Proc. AAAI-2000 Workshop on Learning Statistical Models from Relational Data, 2000, pp. 42-49.

Nikolov, A. et al., (2009) Privacy-Enhancing Distributed Higher-Order ARM. In the Proceedings of the Workshop on Link Analysis, Counterterrorism and Security, SIAM International Conference on Data Mining, Sparks, NV, Apr., 10 pages.

Rennie, J.D.M. et al., "Tackling the poor assumptions of naive Bayes text classifiers", In Proceedings of the Twentieth International Conference on Machine Learning, 2003, 8 pages.

Sarawagi, S. et al., "Cross-Training: Learning Probabilistic Mappings Between Topics", SIGKDD '03, 2003, Washington, DC, USA, 10 pages.

Schutze, H., "Automatic Word Sense Discrimination", Computational Linguistics, vol. 24, No. 1, 1998, pp. 97-124.

Sen, P. et al., "Link-based Classification", University of Maryland Technical Report, No. CS-TR-4858, Feb. 2007, 8 pages.

Taskar, B. et al, "Discriminative Probabilistic Models for Relational Data", In Proceedings of Uncertainty in Artificial Intelligence Conference UAI02, Edmonton, Canada, 2002.

Taskar, B. et al., "Probabilistic Classification and Clustering in Relational Data", In Proc. 17th Internabonal Joint Conference on Artificial Intelligence, 2001, pp. 870-878, 2001.

UNO, T., "Algorithms for Enumerating All Perfect, Maximum and Maximal Matchings in Bipartite Graphs", Lecture Notes in Computer Science, vol. 1350. Proceedings of the 8th International Symposium on Algorithms and Computation, 1997, pp. 92-101, ISBN: 3-540-63890-3, Springer-Verlag, London, UK.

"Vimeo" by Internet Archive WayBackMachine, dated from Jun. 2, 2007, pp. 1-6.

Xu, J. et al., "Corpus-Based Stemming Using Co-Occurrence of Word Variants", ACM Transactions on Information Systems, vol. 16, No. 1, 1998, pp. 61-81.

Zhang, X. et al., "Level search schemes for information filtering and retrieval", Information Processing and Management, vol. 37, No. 2, 2000, pp. 313-334.

* cited by examiner

SYSTEMS AND METHODS FOR DATA TRANSFORMATION USING HIGHER ORDER LEARNING

RELATED APPLICATIONS

This application claims the benefit of U.S. Provisional Application Ser. No. 61/185,255, filed Jun. 9, 2009 and is a continuation-in-part of U.S. patent application Ser. No. 12/317,134 filed Dec. 19, 2008, issued as U.S. Pat. No. 8,301,768, both of which are incorporated herein by reference in their entirety.

FIELD

The present disclosure relates to data transformation, and more specifically to a method and system for data transformation using higher order learning.

BACKGROUND

A well known problem in real-world applications of machine learning is that expert labeling of large amounts of data for training a classifier (a function that maps sets of input features or attributes to classes) is prohibitively expensive. Often in practice, only a small amount of data is available and as a result the amount of labeled data is far from adequate. In this case, making an adequate estimation of the model parameters of a classifier is challenging.

Further, the underlying assumption in traditional machine learning algorithms is that instances are independent and identically distributed ("I.I.D."). This assumption simplifies the underlying mathematics of statistical models, but in fact does not hold for many real world applications. Such models constructed under the I.I.D. assumption only leverage relationships between attributes (meaning a specification that defines a property) within instances (e.g., co-occurrence relationships), and do not model connections between the attributes in different instances. A well-known example is market basket analysis, which forms sets of items that are purchased together. In supervised learning, classification of a single instance of previously unseen data is thus possible because no additional context is needed to infer class membership. However, such a context-free approach does not exploit valuable information about relationships between instances in the dataset.

SUMMARY

This disclosure leverages higher-order (relational) information that enables more efficient learning of both discriminative and generative supervised models as well as unsupervised models.

The disclosure consists of a set of transformations that operate on data in vector form. Each vector is composed of a set of attributes that are either boolean (having one of two values, either 1 or 0) or that have been mapped to boolean form. The vectors may or may not fall into categories assigned (manually or by some other means) by a subject matter expert ("SME"). If categories exist, the categorical labels divide the vectors into subsets. The first transformation calculates a prior probability for each attribute based on the links between attributes in each subset of the vectors. The second transformation computes a new numeric value for each attribute based on the links between attributes in each subset of the vectors. The third transformation operates on vectors that have not been categorized by an SME. Based on the automatic selection of categories from the attributes, this transformation computes a new numeric value for each attribute based on the links between attributes in each subset of the vectors.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
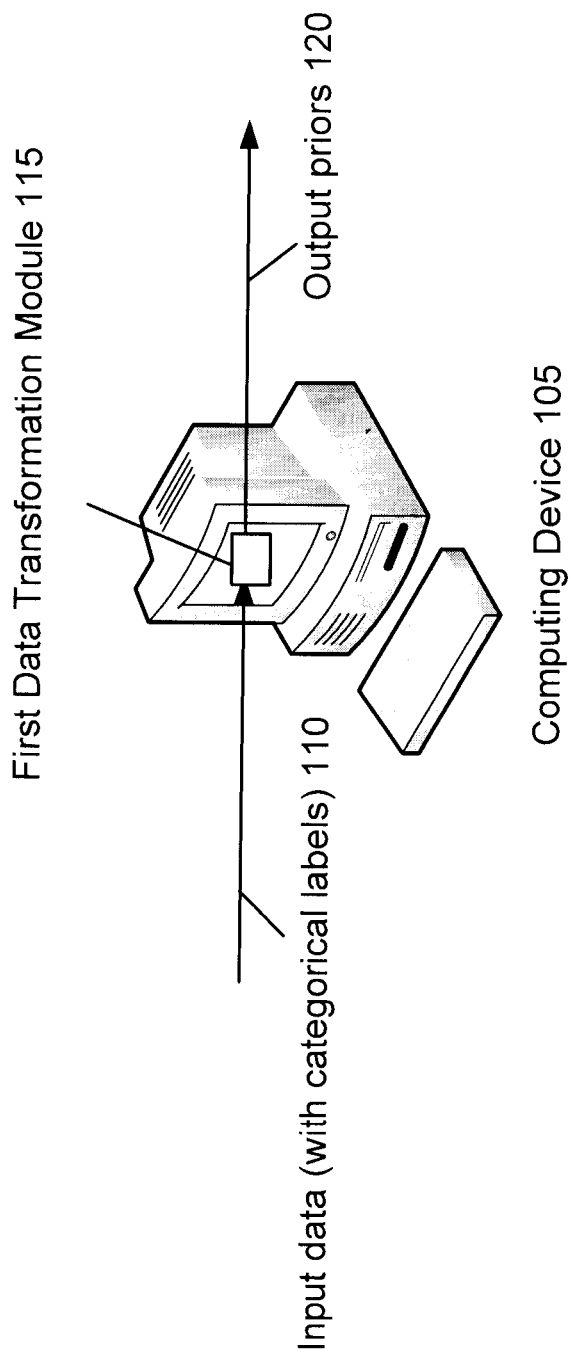
FIG. 1 is a block diagram of a computing device with a first data transformation module in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
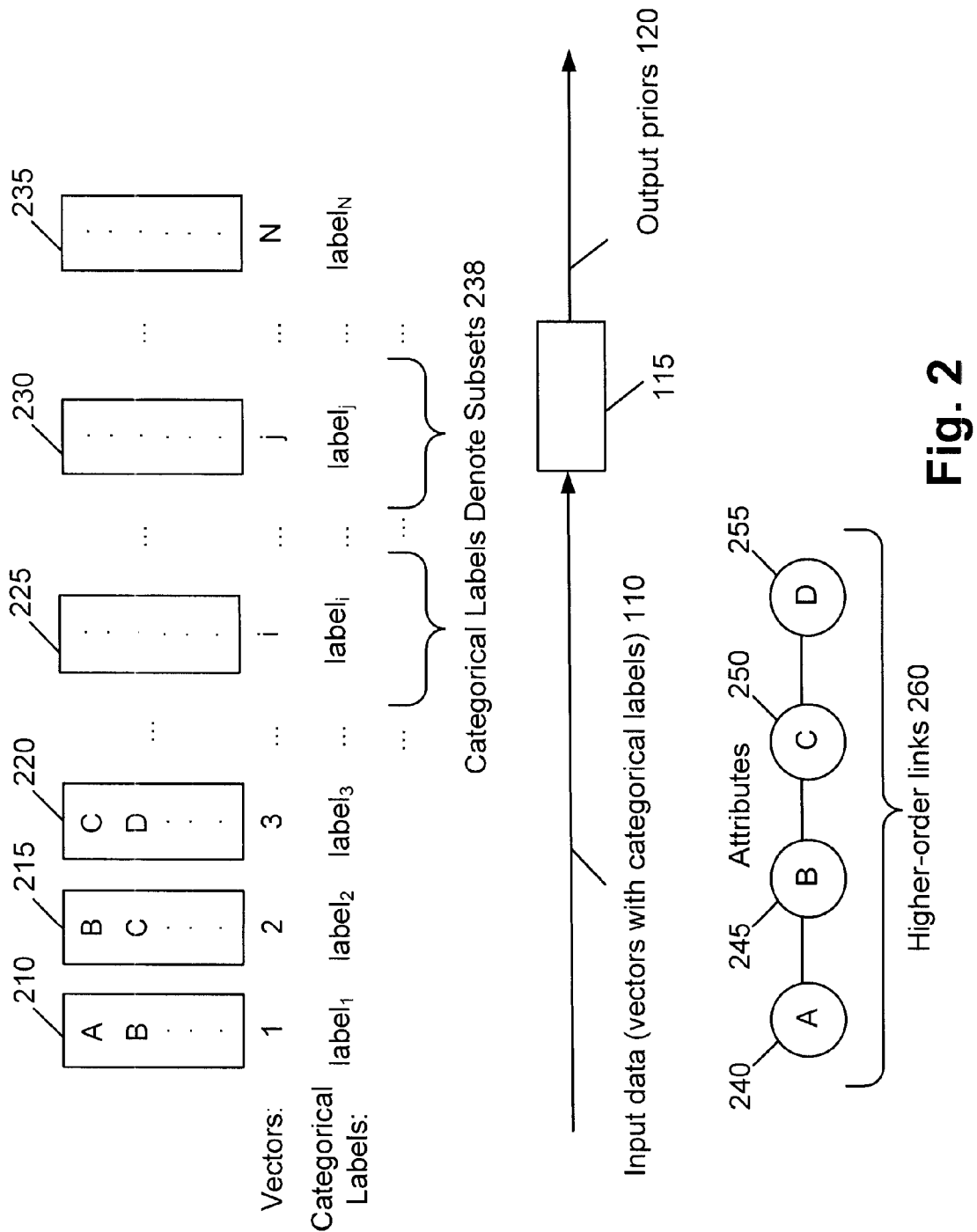
FIG. 2 is a flow diagram of the input vectors of the first data transformation module in accordance with an embodiment of the present disclosure.

FIG. 1 is a block diagram of an embodiment of a computing device with a first data transformation module 115. Input data 110 is composed of vectors of attributes with categorical labels that divide the vectors into subsets. FIG. 2 is an embodiment of a flow diagram of the input data 110. The input data 110 includes vectors 210, 215, 220, 225, 230 and 235. Each vector includes categorical Labels 238 that denote subsets. In one embodiment, the transformation module 115 calculates a prior probability for each attribute A 240, B 245, C 250, and D 255 based on links 260 between attributes 240, 245, 250, 255 in each subset of the vectors 210, 215, 220, 225, 230 and 235. After the first data transformation module 115 operates on the input data 110, the first data transformation module 115 produces calculated prior probabilities (output priors) 120. The output priors are probabilities assigned to attributes based on the patterns of occurrence of the attributes.

In one embodiment, vectors 210, 215, 220, 225, 230, 235 each are composed of a set of attributes that are either boolean or that have been mapped to boolean form. The vectors fall into categories assigned (manually or by some other means) by a subject matter expert (SME) as indicated by the labels below the vectors. These categorical labels divide the vectors into subsets, as exemplified below the vectors.

Example attributes A, B, C and D are shown, as well as their connections based on co-occurrence in vectors. For example, A and B co-occur in vector 210, B and C co-occur in vector 215, etc. This is a first-order co-occurrence, also termed a first-order path or first-order link. A second-order co-occurrence (second-order path or second-order link) is also shown between A and C through B and between B and D, through C. A third-order co-occurrence (third-order path or third-order link) is also shown between A and D through B and C. In the context of Bayesian learning (meaning a statistical inference in which evidence or observations are used to update or to newly infer the probability that a hypothesis may be true), first-, second- and other higher-order links are collectively known as higher-order links 260.

Figure 3:
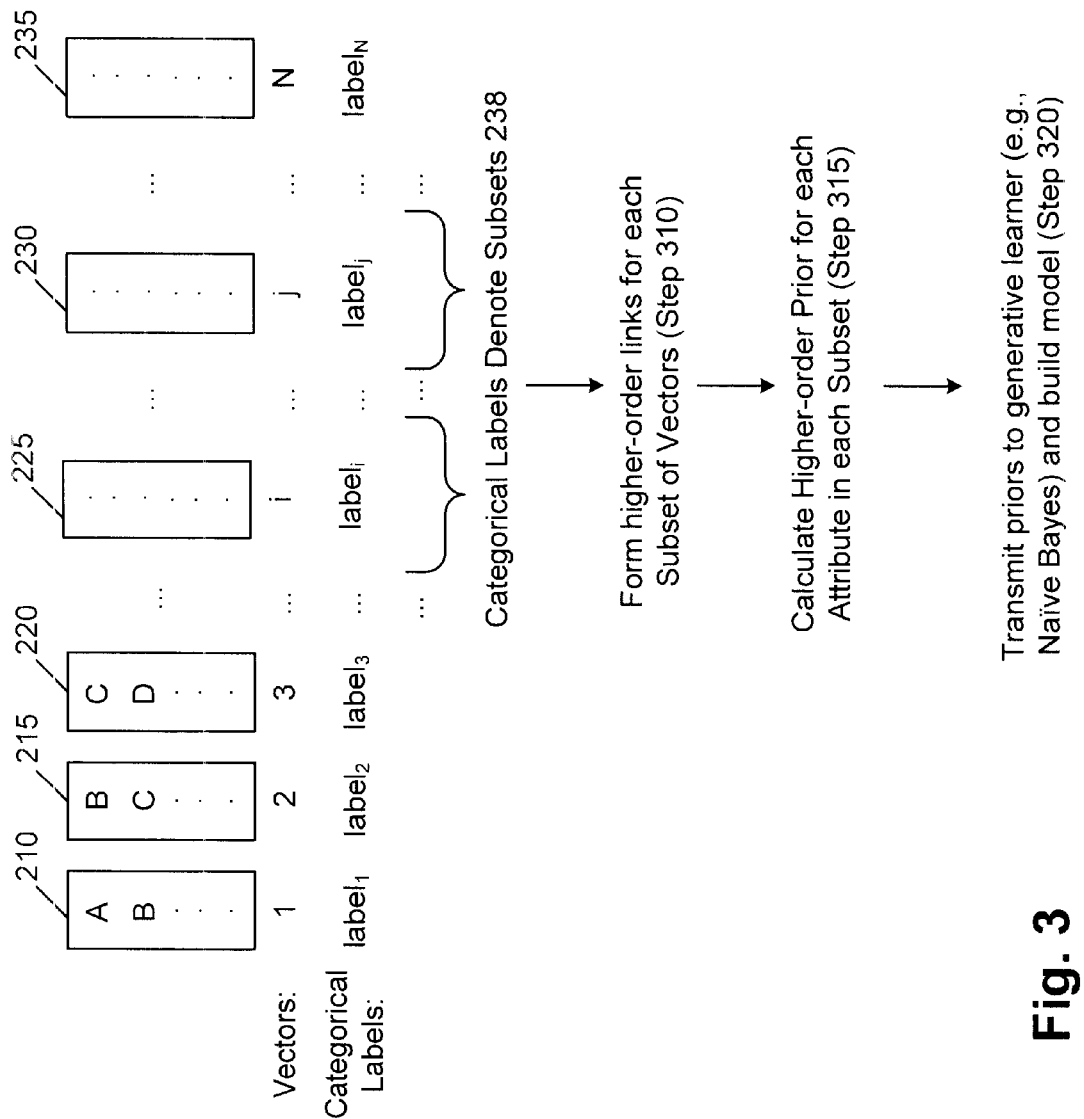
FIG. 3 is a flow diagram of an operation of the first data transformation module in accordance with an embodiment of the present disclosure.

FIG. 3 provides an embodiment of the operation of the transform of the first data transformation module 115. For each subset of vectors (as shown in FIG. 2), higher-order links 260 are formed (Step 310). In one embodiment, traditional (i.e., zero-order) attribute priors are computed from the zero-order probability mass function $P(x^i|X)$ of attribute i defined over two events: presence of attribute i in a randomly chosen vector from a dataset X, and the absence of that attribute. The corresponding conditional probabilities are estimated using the frequency of occurrence of attribute i in dataset X by $$P(x^i = 1 \mid X) = \frac{|\{x: x^i = 1, x \in X\}|}{|X|} \quad (1)$$

$$\text{and} \quad P(x^i = 0 \mid X) = 1 - P(x^i = 1 \mid X).$$

Probabilistic characterization (1) is extended into the space of higher-order links by defining it over sets of higher-order links rather than individual data vectors (Step 315).

Let $\Phi(X)$ denote the set of all higher-order links of a specified order in a dataset X. Further, let $\phi(i,X) \subseteq \Phi(X)$ denote the subset of higher-order links that contain attribute i in dataset X. Set $\phi(i,X)$ defines an event that a randomly chosen higher-order link contains attribute i. Together, sets $\Phi(X)$ and $\phi(i,X)$ allow for characterization of each attribute i by a probability mass function $\hat{P}(x^i|X)$ defined over two events: presence of attribute i in a randomly chosen higher-order link, and the absence of that attribute from a randomly chosen higher-order link. The corresponding conditional higher-order probabilities (i.e., attribute priors) can then be estimated by $$\hat{P}(x^i = 1 \mid X) = \frac{|\varphi(i, X)|}{\Phi(X)}, \quad (2)$$

$$\text{and} \quad \hat{P}(x^i = 0 \mid X) = 1 - \hat{P}(x^i = 1 \mid X).$$

As an example, (2) can be applied to parameter estimation in the well-known Naïve Bayes classifier, which assumes that the preference (or absence) of a particular feature of a class is unrelated to the presence (or absence) of any other feature, given an attribute i and a vector subset $X_j$ with class label $c_j$ as follows $$\hat{P}(i \mid c_j) = \frac{1 + \varphi(i, X_j)}{2 + \Phi(X_j)}, \quad (3)$$

with class probability $$\hat{P}(c_j) = \frac{\Phi(X_j)}{\sum_{k=1}^{K} \Phi(X_k)}. \quad (4)$$

This forms a new learner, Higher Order Naïve Bayes.

In one embodiment, attribute priors produced from step 315 are then transmitted to a generative learner (an algorithm that generates a model from the respective subsets of labeled vectors) such as Naïve Bayes, and are used to build a model (Step 320). After model construction is complete, the model can be used to classify previously unseen vectors.

In one embodiment, first data transformation module 115 has been used in conjunction with generative learners in a variety of settings including text (e.g., web pages, newsgroup postings, etc.) classification, radio-nuclear signal classification, and threat detection in streaming data.

Figure 4:
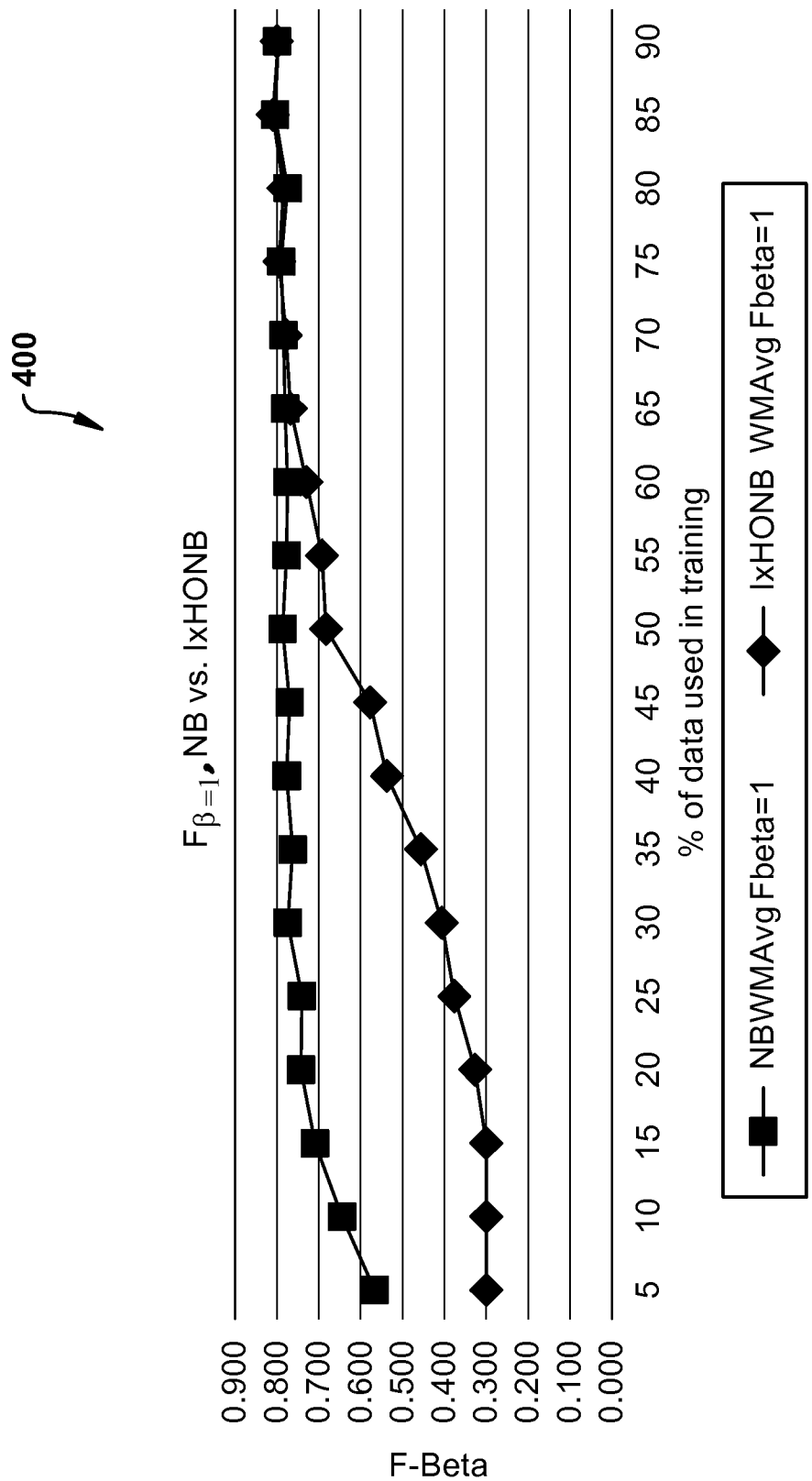
FIG. 4 is a graph showing the performance of applying the transform of the first data transformation module of FIG. 1 in a defense setting in accordance with an embodiment of the present disclosure.

FIG. 4 shows a graph 400 of an embodiment of the performance of applying the transform of the first data transformation module 115 in a defense setting where the goal is to identify threats from streaming data. In one embodiment, the $F_\beta$ metric (which averages precision and recall) is most useful. In one embodiment, both precision and recall are important: precision, to reduce the signal-to-noise ratio, and recall, to prevent overlooking valuable information. Here, the transform of the first data transformation module 115 used in Naïve Bayes (IxHONB™ in FIG. 4) resulted in a strong performance advantage, especially for smaller training datasets (datasets used to train a classifier to generate a model for use in classifying previously unseen data). The differences were highly significant up to 60% sample size, after which traditional (zero-order) Naïve Bayes had sufficient data to learn a model. FIG. 4 depicts an embodiment of these results for $\beta=1$, which weights precision and recall equally.

Figure 5:
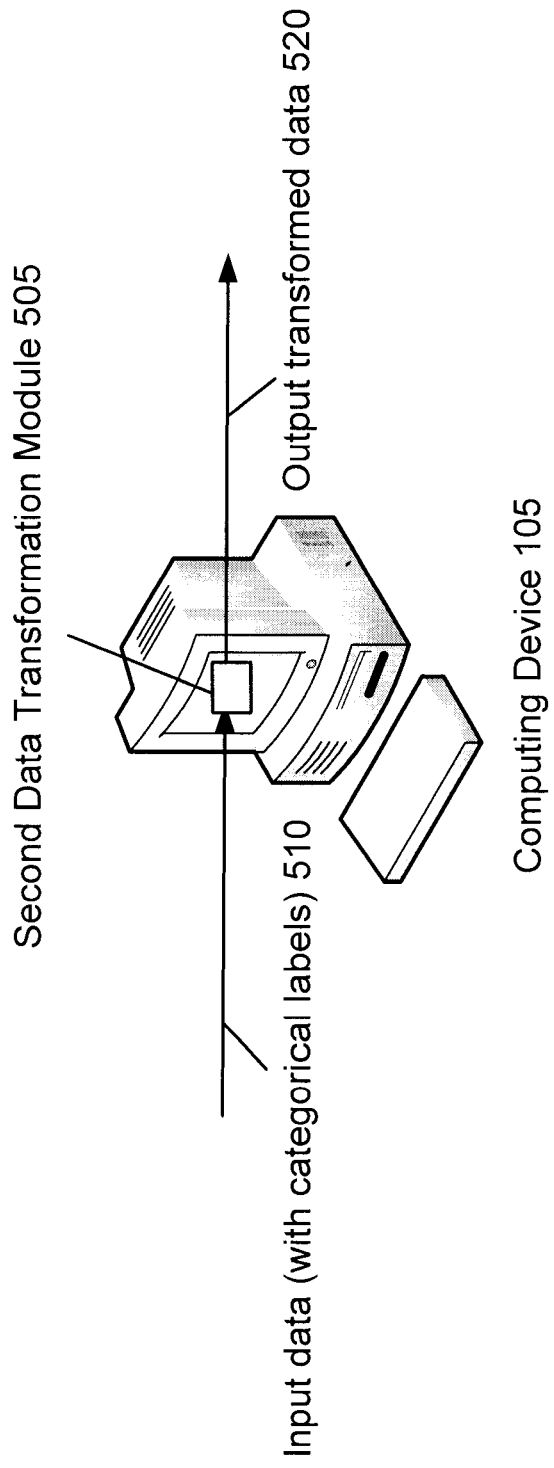
FIG. 5 is a block diagram of a computing device with a second data transformation module in accordance with an embodiment of the present disclosure.
Figure 6:
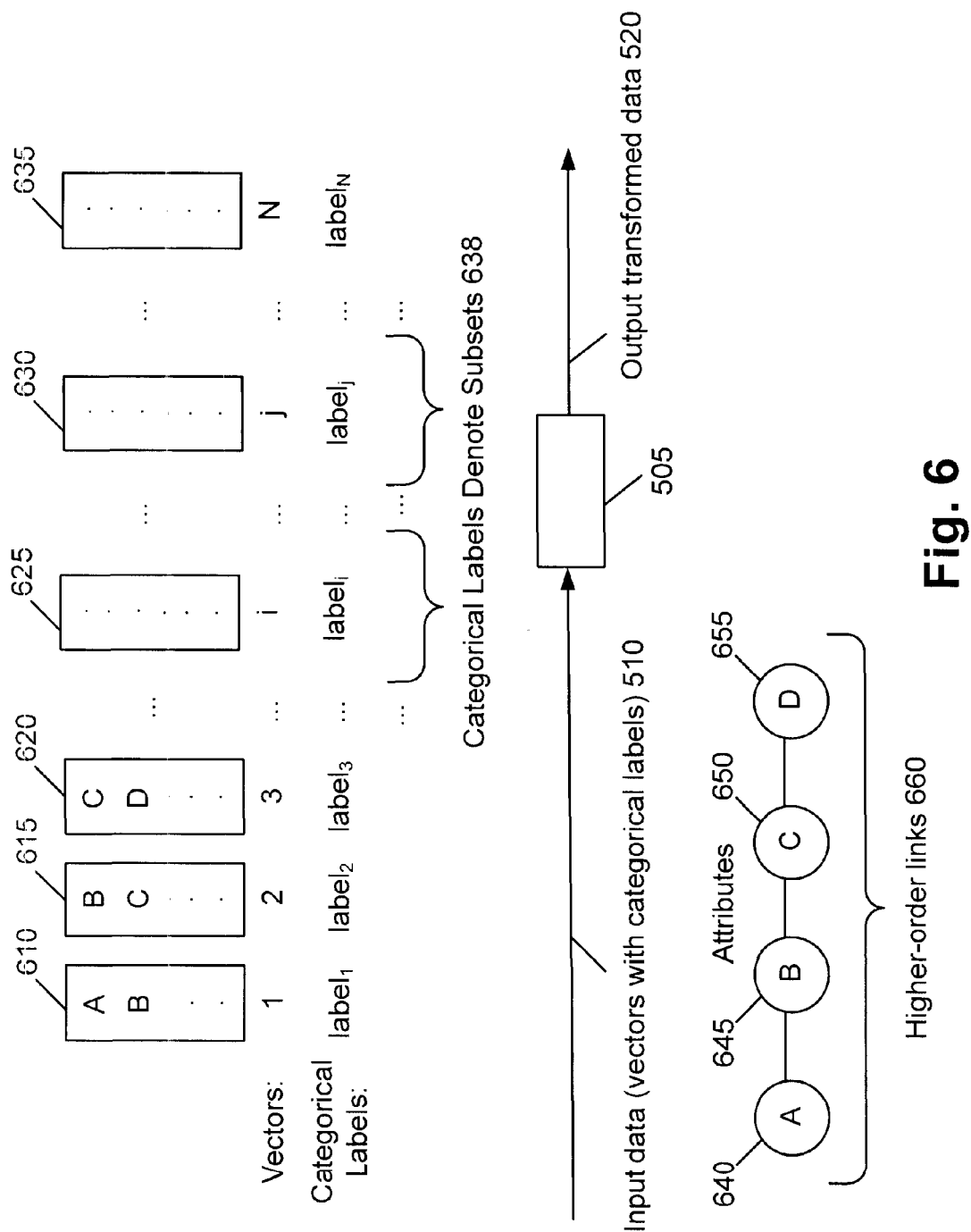
FIG. 6 is a flow diagram of the input vectors of the second data transformation module in accordance with an embodiment of the present disclosure.
Figure 7:
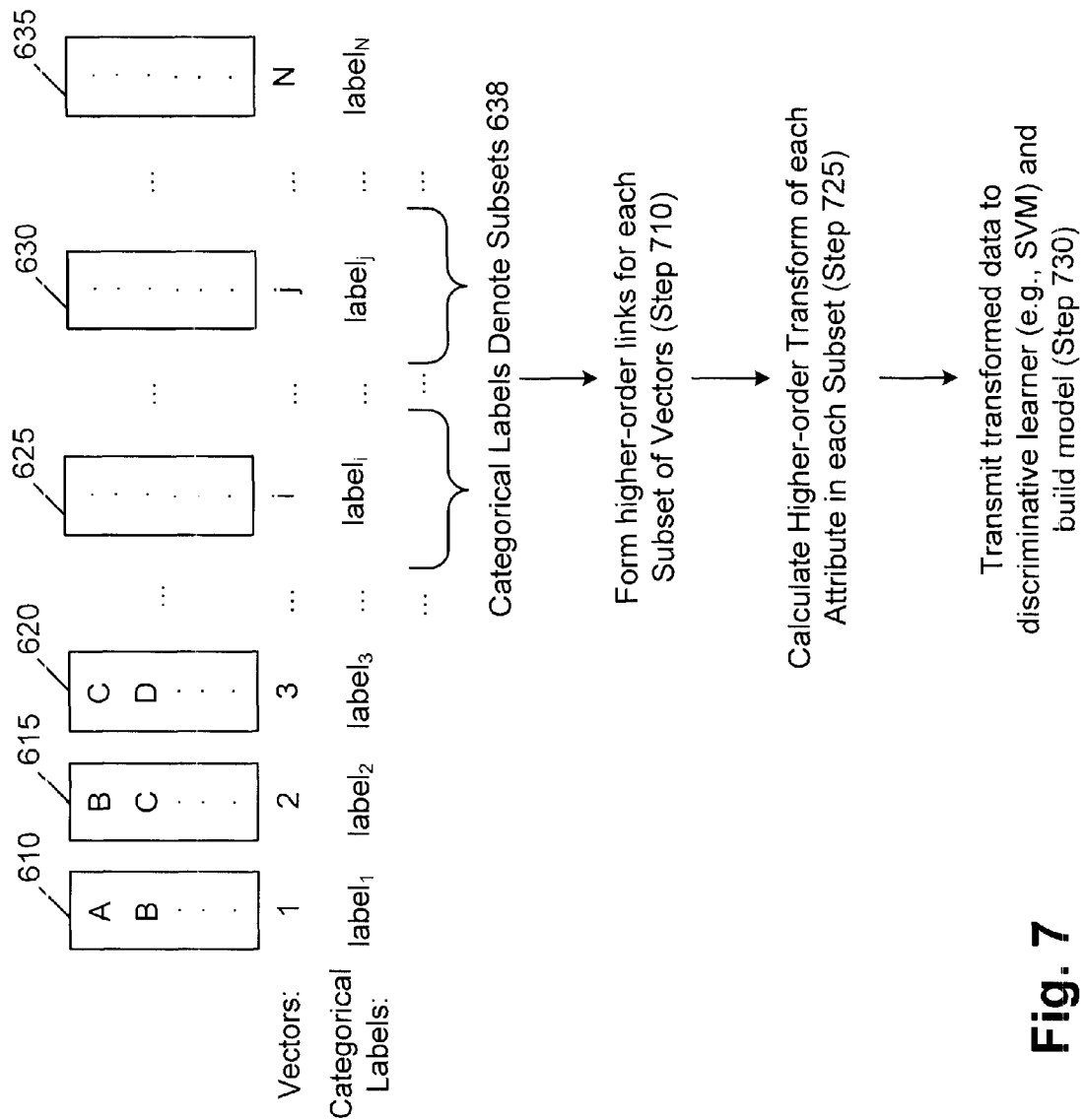
FIG. 7 is a flow diagram of an operation of the second data transformation module in accordance with an embodiment of the present disclosure.

FIG. 5 is a block diagram of computing device 105 with a second data transformation module 505. Input data 510 that is composed of vectors of attributes with categorical labels that divide the vectors into subsets is transmitted to the data transformation module 505. FIG. 6 shows an embodiment of the input vectors. In one embodiment, the second data transformation module 505 computes a new numeric value for each attribute based on the links between attributes in each subset of the vectors. FIG. 7 illustrates an embodiment of the operation of the transform performed by the second data transformation module 505. The output of the second data transformation module 505 is output transformed data 520.

FIG. 6 is an embodiment of a flow diagram of the second data transformation module 505 receiving input data 510 as vectors containing attributes A 640, B 645, C 650, and D 655 and associated labels. In one embodiment, vectors 610, 615, 620, 625, 630, 635 are each composed of a set of attributes that are either boolean or have been mapped to boolean form. The vectors fall into categories assigned (manually or by some other means) by a subject matter expert (SME) as indicated by the Labels 638 below the vectors. These categorical labels divide the vectors into subsets, as exemplified below the vectors.

In one embodiment, example attributes A 640, B 645, C 650, and D 655 are shown, as well as their connections based on co-occurrence in vectors. For example, A and B co-occur in vector 610, B and C co-occur in vector 615, etc. This is a first-order co-occurrence (a first-order path or first-order link). A second-order co-occurrence (second-order path or second-order link) is also shown between A and C through B and between B and D, through C. A third-order co-occurrence (third-order path or third-order link) is also shown between A and D through B and C. In the context of Bayesian learning, first-, second- and other higher-order links are collectively known as higher-order links.

FIG. 7 is an embodiment of a flow diagram of the operation of the transform of the second data transformation module 505. For each subset of vectors 610, 615, 620, 625, 630, and 635, higher order links 660 are formed (Step 710). In one embodiment, the second data transformation module 505 then calculates a higher order transform of each attribute in each subset (Step 725). Let $C=\{c_1, \ldots, c_K\}$ denote the set of categorical (i.e., class) labels. Given two sets $X_j$ and $X_k$ of (possibly binarized training) vectors from subsets $c_j$ and $c_k$, respectively, the class conditional higher-order attribute probabilities (attribute priors in equation (2) from above, Step 725) are computed. Let us denote the corresponding conditional log likelihood ratios as $$\phi_i^{(1)} = \log \frac{\hat{P}(x^i \mid X_j)}{\hat{P}(x^i \mid X_k)}, \quad (5)$$

and $$\phi_i^{(0)} = \log \frac{1 - \hat{P}(x^i \mid X_j)}{1 - \hat{P}(x^i \mid X_k)}. \quad (6)$$

Each binary vector $x=(x^1, \ldots, x^n)$, $x \in X_j \cup X_k$, is then transformed into a real vector $\hat{x}=(\hat{x}^1, \ldots, \hat{x}^n)$, where $$\hat{x}^i = \begin{cases} \frac{\phi_i^{(1)}}{\sqrt{|\phi_i^{(1)}|}}, & \text{if } x^i = 1, \phi_i^{(1)} \neq 0 \\ \frac{\phi_i^{(0)}}{\sqrt{|\phi_i^{(0)}|}}, & \text{if } x^i = 0, \phi_i^{(0)} \neq 0 \\ 0, & \text{otherwise.} \end{cases} \quad (7)$$

Finally, the resulting dataset $\hat{X}_j \cup \hat{X}_k$ is used as input for training a classifier (a function that maps sets of input features or attributes to classes) for categories $c_j$ and $c_k$.

Data transformation (7) assigns weights that are high in absolute values for attributes present in a vector that are highly discriminative (meaning attributes that are efficacious in distinguishing between subsets of labeled vectors). The normalizing factors in (7) moderate the spread of values of each attribute in order to allow less discriminative attributes to retain a certain level of influence over the classification. This level of influence depends on the discriminative power of an attribute as measured by (5) and (6).

In Step 730, the data transformed is transmitted to a discriminative learner (an algorithm that constructs a model from subsets of labeled vectors by discriminating between the vectors) such as a Support Vector Machine (SVM), and used to build a model. After model construction is complete, the model can be used to classify previously unseen vectors.

In one embodiment, experiments were carried out on three widely-used text corpora (a body of text considered to be representative of a topic): RELIGION, SCIENCE and POLITICS subsets of 20 News Groups (20NG) benchmark data. In one embodiment, cross-postings in the 20NG data were removed. Then, in one embodiment, for each dataset stop word removal, stemming (reducing inflected words to their root form) and removal of all terms that occurred in fewer than three documents in the dataset was performed. The remaining terms were ranked in one embodiment by Information Gain (which defines a preferred sequence of attributes to investigate to more rapidly construct a model). In one embodiment, the top 2000 terms were selected. In one embodiment, 500 documents were sampled at random from each class to comprise the 20NG datasets used in the experiments. In order to simulate a real-world scenario where only a few labeled data vectors are available, in one embodiment attention was focused on 5% training samples. In one embodiment, this corresponded to training on 25 documents per class and testing on the other 475 documents per class. Classification accuracies averaged over eight trials are reported in Table 1 below. Highest accuracies attained on each dataset are highlighted in italics. The corresponding standard deviations are also reported. The obtained results indicate that leveraging higher-order links leads to significant improvements in classification accuracies.

TABLE 1

| Dataset | SVM Accuracy | Standard Deviation | Transform with SVM Accuracy | Standard Deviation |
|---|---|---|---|---|
| RELIGION (3) | 0.699 | 0.022 | *0.723* | 0.023 |
| SCIENCE (4) | 0.751 | 0.029 | *0.792* | 0.039 |
| POLITICS (3) | 0.763 | 0.03 | *0.793* | 0.047 |

Figure 8:
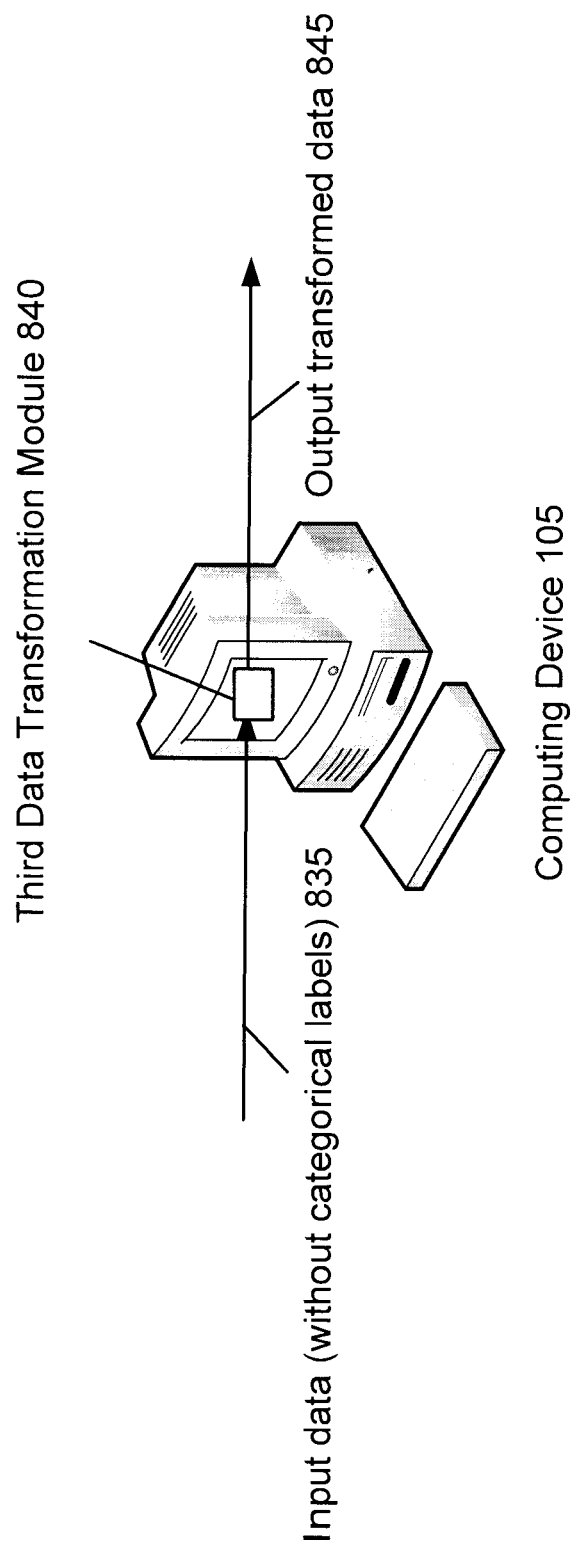
FIG. 8 is a block diagram of a computing device with a third data transformation module in accordance with an embodiment of the present disclosure.
Figure 9:
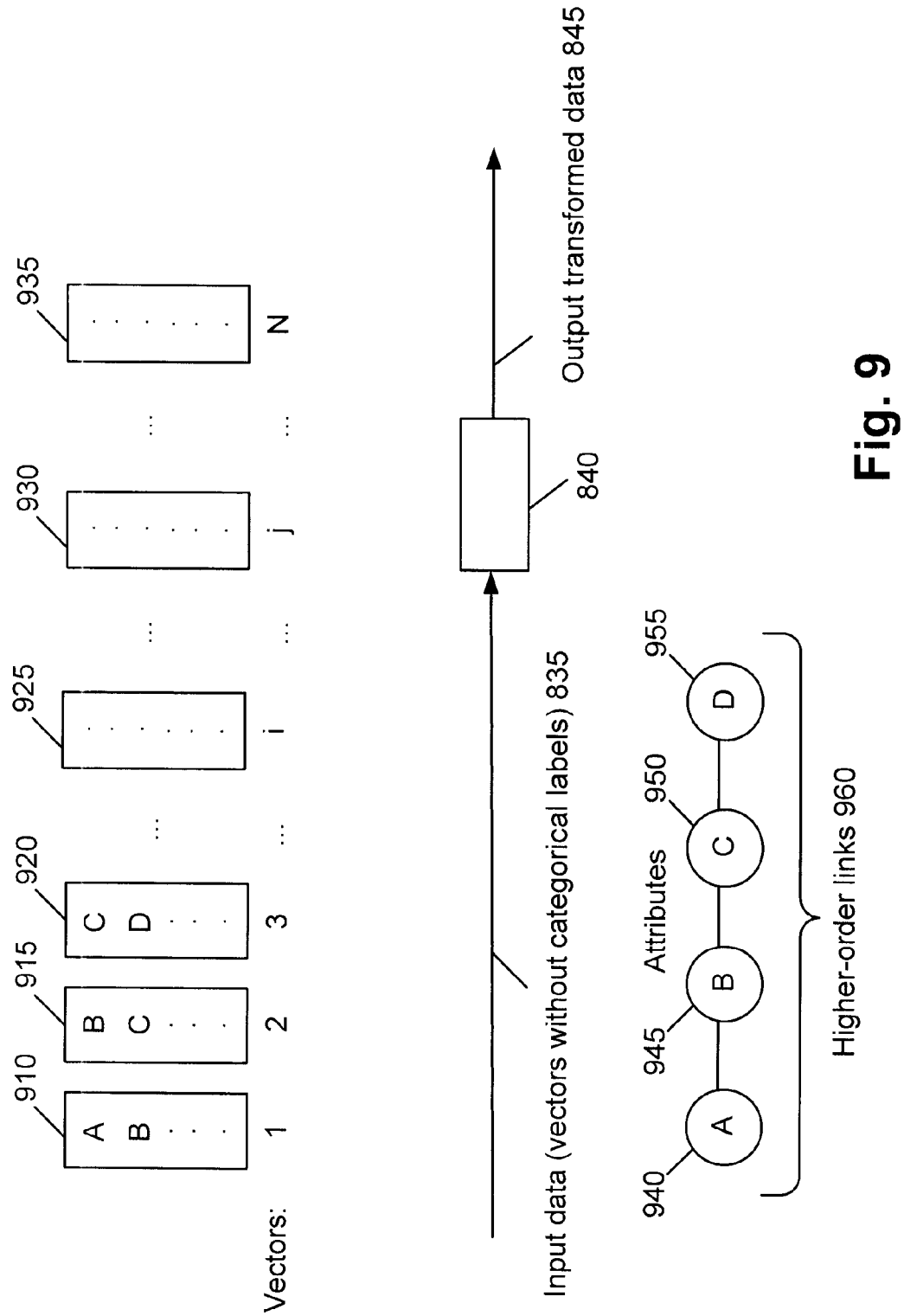
FIG. 9 is a flow diagram of the input vectors of the third data transformation module in accordance with an embodiment of the present disclosure.

FIG. 8 illustrates a block diagram of an embodiment of a computing device 105 with a third data transformation module 840. In one embodiment, input data 835 is composed of vectors of attributes without categorical labels. FIG. 9 shows an embodiment of a flow diagram of the input vectors. Based on the automatic selection of categories from the attributes, in one embodiment the transformation module 840 computes a new numeric value for each attribute based on the links between attributes in each subset of the vectors. The output of the third data transformation module 840 is output transformed data 845.

FIG. 9 illustrates the third data transformation module 840 receiving input data as vectors containing attributes A 940, B 945, C 950, and D 955 without associated labels. Vectors 910, 915, 920, 925, 930, and 935 are each composed of a set of attributes that are either boolean or have been mapped to boolean form. In one embodiment, the vectors are not categorized. Example attributes A 940, B 945, C 950 and D 955 are shown, as well as their connections based on co-occurrence in vectors. For example, A and B co-occur in vector 910, B and C co-occur in vector 915, etc. This is a first-order co-occurrence (a first-order path or first-order link). A second-order co-occurrence (second-order path or second-order link) is also shown between A and C through B and between B and D, through C. A third-order co-occurrence (third-order path or third-order link) is also shown between A and D through B and C. As described above, in the context of Bayesian learning, first-, second- and other higher-order links are collectively known as higher-order links.

Figure 10:
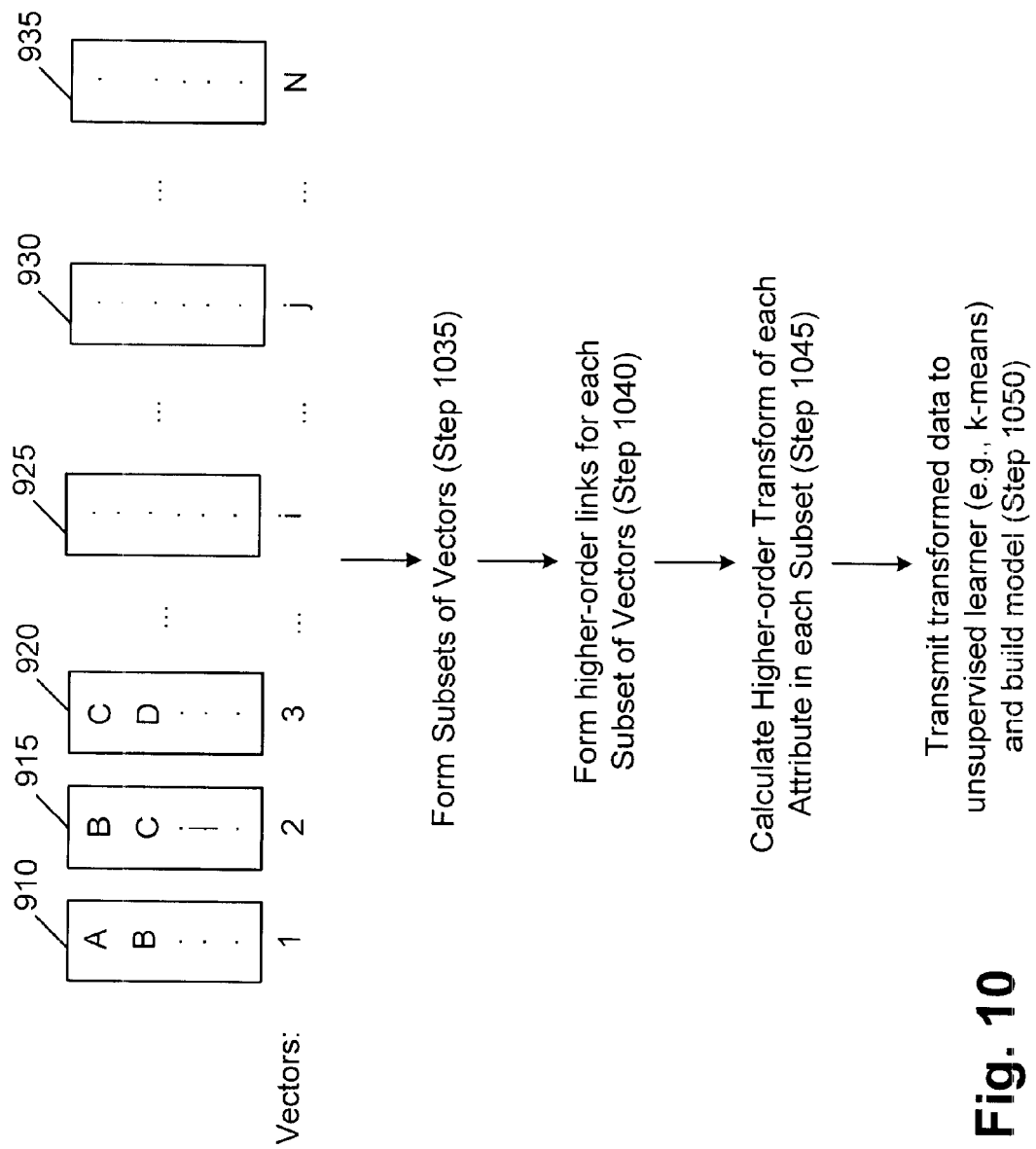
FIG. 10 is a flow diagram of an operation of the third data transformation module in accordance with an embodiment of the present disclosure.

FIG. 10 provides an embodiment of a flow diagram of the operation of the transform applied by the third data transformation module 840. In one embodiment, candidate categorical labels are automatically selected in sequence using each attribute in turn, and these categorical labels divide the vectors into subsets (Step 1035). For each subset of vectors from Step 1035, higher-order links 960 are formed (Step 1040).

In one embodiment, the overall scheme of the transformation is as follows. Each attribute i partitions a n-dimensional boolean space $X=\{0,1\}^n$ into two subspaces: $X_1(i)=\{x:x^i=1, x \in X\}$ and $X_0(i)=X \setminus X_1(i)$. In each of the subspaces $X_1(i)$ and $X_0(i)$, attribute i is represented as a probabilistic function of all attributes. This probabilistic function is defined over the space of higher-order links. A second function then unifies these representations across subspaces $X_1(i)$ and $X_0(i)$, and produces the final transformation (Step 1045). The unifying function also acts as a filter and prevents attributes that exhibit the same distribution in both subspaces $X_1(i)$ and $X_0(i)$ from influencing the transformation of attribute i.

Given a set $X \subseteq X$ of n-dimensional boolean vectors, the two disjoint subsets (subsets that have no element in common) determined by some attribute i are denoted as $X_1(i)=\{x: x^i=1, x \in X\}$ and $X_0(i)=X \setminus X_1(i)$. Here $\varphi(i,X)$ denotes the subset of higher-order paths that contain attribute i in a dataset X, while $\Phi(X)$ denotes the set of all higher-order paths in X.

In order to capture the probabilistic relationships between attribute i and other attributes, the conditional higher-order probability mass function is defined as $$P'(x^i \mid x^1, \ldots, x^n) = \frac{P'(x^1, \ldots, x^n \mid X_{x^i}(i)) P'(X_{x^i}(i))}{P'(x^1, \ldots, x^n)}, \quad (8)$$

where the higher-order probability $P'(X_{x^i}(i))$ of subset $X_{x^i}(i)$ is estimated by the ratio of the number of higher-order paths in that subset, $$P'(X_{x^i}(i)) = \frac{|\Phi(X_{x^i}(i))|}{|\Phi(X_1(i))| + |\Phi(X_0(i))|}. \quad (9)$$

To make computation of the joint probability $P'(x^1, \ldots, x^n \mid X_{x^i}(i))$ tractable, the common (naïve) assumption of conditional independence of attributes given the value of attribute i is made. It follows that $$P'(x^1, \ldots, x^n \mid X_{x^i}(i)) = \prod_{j=1}^{n} P'(x^j \mid x^i), \quad (10)$$

where the conditional higher-order probability mass function $P'(x^j \mid x^i)$ is estimated by $$P'(x^j = 1 \mid x^i) = \frac{|\varphi(j, X_{x^i}(i))|}{|\Phi(X_{x^i}(i))|}. \quad (11)$$

The probability mass function $P'(x^j \mid x^i)$ is completely defined by (11), since $P'(x^j=0 \mid x^i) = 1 - P'(x^j=1 \mid x^i)$.

The proposed transform is a non-linear mapping $Z=(z^1(x), \ldots, z^n(x)):\{0,1\}^n \to \Re^n$, from a n-dimensional boolean space X to a n-dimensional real space Z. A notable feature of this mapping is that dimensions of space Z correspond to the original attributes and, therefore, maintain their interpretability. Function Z maps each boolean attribute i to the real domain by a non-linear function $z^i(x^1, \ldots, x^n):\{0,1\} \to \Re^n$. Mapping functions $z^i$ are defined over the space of higher-order paths as $$z^i(x^1, \ldots, x^n) = \frac{P'(x^i = 1 \mid x^1, \ldots, x^n)}{P'(x^i = 0 \mid x^1, \ldots, x^n)} \quad (12)$$

$$= \prod_{j=1}^{n} \frac{P'(x^j \mid x^i = 1)}{P'(x^j \mid x^i = 0)} \frac{P'(X_1(i))}{P'(X_0(i))}.$$

For convenience of numerical computation, in practice a log transformation of the mapping functions (12) is used $$\log z^i(x^1, \ldots, x^n) = \sum_{j=1}^{n} \frac{P'(x^j \mid x^i = 1)}{P'(x^j \mid x^i = 0)} + \log \frac{P'(X_1(i))}{P'(X_0(i))}. \quad (13)$$

A relationship with the supervised learning theory can be noted here. It can be recognized that the mapping function (13) is the Naïve Bayes discriminant function defined over the space of higher-order paths rather than the traditional (zero-order) attribute frequencies, and where attribute i plays a role of the class indicator. The data transformed in Step 1045 is transmitted 10 an unsupervised learner such as the k-means clustering algorithm and used to build a model (Step 1050). After model construction is complete, the model can be used to categorize previously unseen vectors.

In one embodiment, the experimental evaluation described herein was carried out on four benchmark text corpora. Three of these datasets were the RELIGION, SCIENCE and POLITICS subsets of the 20 News Groups (20NG) benchmark data with cross postings and stop words removed and other words stemmed. In one embodiment, to keep the computation manageable. 500 documents were sampled at random from each class to comprise the 20NG datasets used in the experiments. In one embodiment, the other dataset, BBC, contained 2225 news stories from the British Broadcasting Corporation (BBC). In one embodiment, each news story belonged to one of five classes: business, entertainment, politics, sport, or technology. In one embodiment, the BBC dataset was preprocessed by the curators of the dataset, who removed stop words and stemmed the remaining words. In one embodiment, for each dataset, those attributes were selected whose minimum-frequency value covered at least five percent of data vectors in the dataset. (In one embodiment, other terms would have low variability and would therefore be largely ignored by the clustering process).

In one embodiment, class reconstruction errors attained by the k-means clustering criteria on Boolean (original), zero-order and second-order spaces are reported in Table 2 below for the benchmark datasets. In one embodiment, performance improvements attained as a result of applying the transform of the third data transformation module 840 were statistically significant at the 5% level. Moreover, the improvements were consistent across datasets, which indicates that module 840 was able to increase separability between the various homogeneous subgroups of data vectors. In one embodiment, Table 2 also demonstrates that using only the zero-order information is not sufficient for increasing separability between the underlying subgroups.

TABLE 2

| Data | Boolean | Zero-order | Transform 840 |
|---|---|---|---|
| REL (3) | 0.632 | 0.627 | 0.56 |
| POL (3) | 0.642 | 0.643 | 0.523 |
| SCI (4) | 0.587 | 0.7 | 0.545 |
| BBC (5) | 0.222 | 0.284 | 0.185 |

Figure 11:
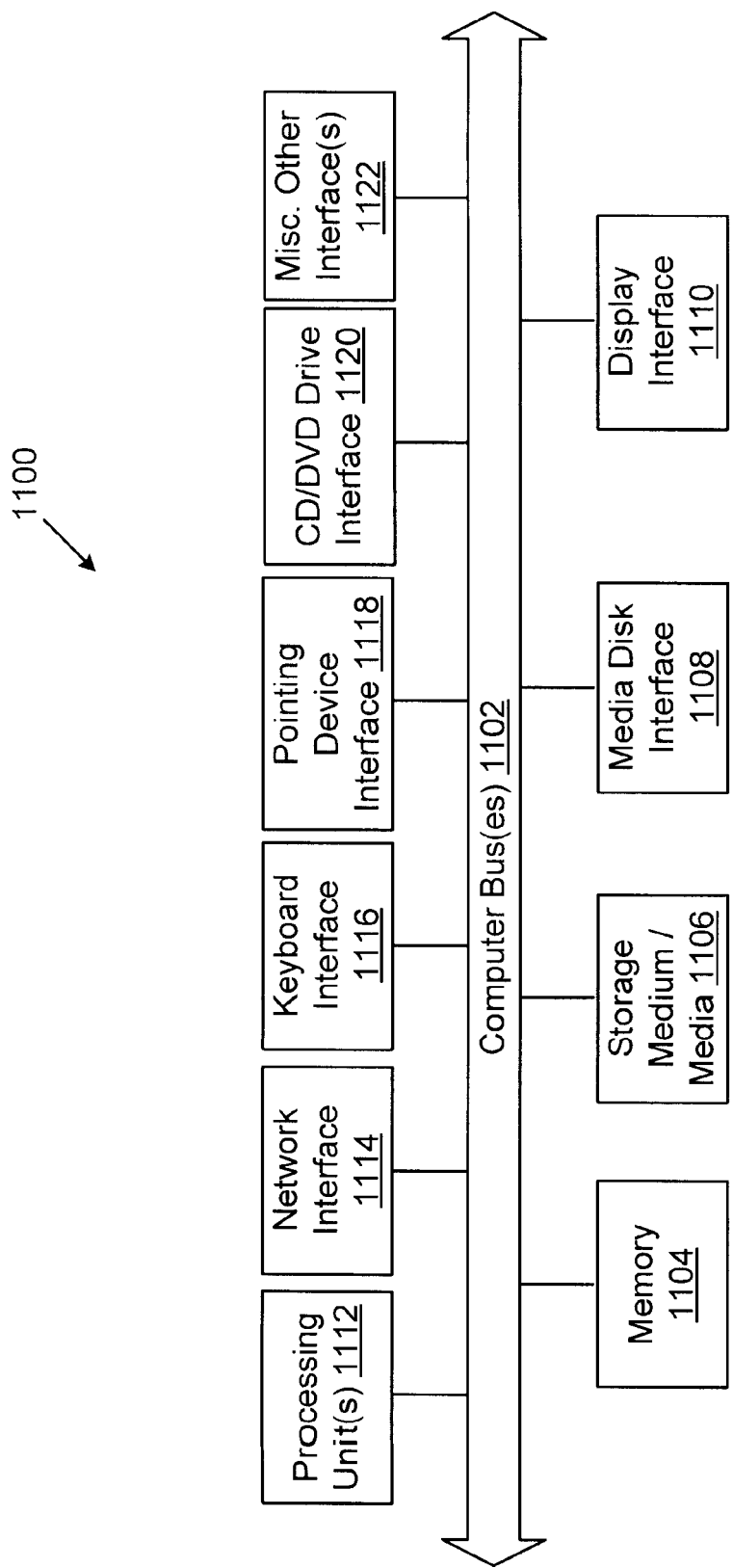
FIG. 11 is a high level block diagram of a computing device in accordance with an embodiment of the present disclosure.

FIG. 11 is a block diagram illustrating an internal architecture of an example of a computing device, such as computing device 105, in accordance with one or more embodiments of the present disclosure. As shown in FIG. 11, internal architecture 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, playlists and other files. Persistent storage medium/media 1106 can further include program modules and data files used to implement one or more embodiments of the present disclosure.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method for transforming data comprising:
    receiving, by a computing device, input data with categorical labels, the input data comprising vectors and each categorical label denoting a subset of the vectors;
    forming, by the computing device, higher-order links for each subset of the vectors;
    calculating, by the computing device, a higher-order transform for each attribute in each subset by calculating a higher-order prior for each attribute in each subset, wherein each higher-order prior represents a probability corresponding to the associated attribute that is based on one or more patterns of occurrence of the attribute, wherein calculating a higher-order prior comprises estimating the higher-order prior by:

$$\hat{P}(x^i = 1 \mid X) = \frac{|\varphi(i, X)|}{|\Phi(X)|}, \text{ and } \hat{P}(x^i = 0 \mid X) = 1 - \hat{P}(x^i = 1 \mid X)$$

where $\Phi(X)$ denotes a set of higher-order links of a specified order in a dataset X, $\phi(i,X) \subset \Phi(X)$ denotes a subset of higher-order links that contain attribute i in dataset X, set $\phi(i,X)$ defines an event that a randomly chosen higher-order link contains attribute i, sets $\Phi(X)$ and $\phi(i,X)$ allow for characterization of each attribute i by a probability mass function $\hat{P}(x^i|X)$ defined over two events: presence of attribute i in a randomly chosen higher-order link, and an absence of that attribute from a randomly chosen higher-order link; and transmitting, by the computing device, transformed data to a learner to build a model.

2. The method of claim 1 wherein the transmitting transformed data to a learner further comprises transmitting transformed data to a generative learner.

3. The method of claim 1 wherein the transmitting transformed data to a learner further comprises transmitting transformed data to a discriminative learner.

4. The method of claim 1 wherein the transmitting transformed data to a learner further comprises transmitting transformed data to an unsupervised learner.

5. The method of claim 1 further comprising building a model using the transformed data.

6. The method of claim 1 further comprising determining a second higher-order transform, wherein corresponding conditional log likelihood ratios are defined as:

$$\phi_i^{(1)} = \log \frac{\hat{P}(x^i | X_j)}{\hat{P}(x^i | X_k)},$$

and $$\phi_i^{(0)} = \log \frac{1 - \hat{P}(x^i | X_j)}{1 - \hat{P}(x^i | X_k)},$$

where $C=\{c_1, \ldots, c_K\}$ denotes a set of categorical labels, two sets $X_j$ and $X_k$ of vectors are from subsets $c_j$ and $c_k$, respectively, and wherein each binary vector $x=(x^1, \ldots, x^n)$, $x \in X_j \cup X_k$, is then transformed into a real vector $\hat{x}=(\hat{x}^1, \ldots, \hat{x}^n)$, where $$\hat{x}^i = \begin{cases} \frac{\phi_i^{(1)}}{\sqrt{|\phi_i^{(1)}|}}, & \text{if } x^i = 1, \phi_i^{(1)} \neq 0 \\ \frac{\phi_i^{(0)}}{\sqrt{|\phi_i^{(0)}|}}, & \text{if } x^i = 0, \phi_i^{(0)} \neq 0 \\ 0, & \text{otherwise.} \end{cases}$$

7. The method of claim 1, further comprising determining a second higher-order transform, wherein each attribute i partitions a n-dimensional boolean space $X=\{0,1\}^n$ into two subspaces: $X_1(i)=\{x:x^i=1, x \in X\}$ and $X_0(i)=X \setminus X_1(i)$, wherein in each of the subspaces $X_1(i)$ and $X_0(i)$, attribute i is represented as a probabilistic first function of all attributes, this probabilistic first function being defined over a space of higher-order links, and a second function unifies representations across subspaces $X_1(i)$ and $X_0(i)$, and produces a final transformation.

8. The method of claim 7 wherein the unifying function acts as a filter and prevents attributes that exhibit a same distribution in both subspaces $X_1(i)$ and $X_0(i)$ from influencing the transformation of attribute i.

9. The method of claim 8 wherein, given a set $\overline{X} \subset X$ of n-dimensional boolean vectors, two disjoint subsets determined by some attribute i are denoted as $X_1(i)=\{x:x^i=1, x \in \overline{X}\}$ and $X_0(i)=\overline{X} \setminus X_1(i)$, $\phi(i,X)$ denotes a subset of higher-order paths that contain attribute i in a dataset X, and $\Phi(X)$ denotes a set of all higher-order paths in X, and a conditional higher-order probability mass function is defined as $$P'(x^i | x^1, \ldots, x^n) = \frac{P'(x^1, \ldots, x^n | X_{x^i}(i)) P'(X_{x^i}(i))}{P'(x^1, \ldots, x^n)},$$

where a higher-order probability $P'(X_{x^i}(i))$ of subset $X_{x^i}$ is estimated by the ratio of number of higher-order paths in that subset, $$P'(X_{x^i}(i)) = \frac{|\Phi(X_{x^i}(i))|}{|\Phi(X_1(i))| + |\Phi(X_0(i))|}.$$

10. The method of claim 9 wherein naïve assumption of conditional independence of attributes given the value of attribute i is:

$$P'(x^1, \ldots, x^n | X_{x^i}(i)) = \prod_{j=1}^{n} P'(x^j | x^i),$$

where conditional higher-order probability mass function $P'(x^j|x^i)$ is estimated by $$P'(x^j = 1 | x^i) = \frac{|\varphi(j, X_{x^i}(i))|}{|\Phi(X_{x^i}(i))|}$$

since $P'(x^j=0|x^i)=1-P'(x^j=1|x^i)$, and the proposed transform is a non-linear mapping $Z=(z^1(x), \ldots, z^n(x)): \{0,1\}^n \rightarrow \Re^n$, from a n-dimensional boolean space X to a n-dimensional real space Z, where function Z maps each boolean attribute i to the real domain by a non-linear function $z^i(x^1, \ldots, x^n): \{0,1\}^n \rightarrow \Re^n$, and mapping functions $z^i$ are defined over space of higher-order paths as $$z^i(x^1, \ldots, x^n) = \frac{P'(x^i = 1 | x^1, \ldots, x^n)}{P'(x^i = 0 | x^1, \ldots, x^n)}$$

$$= \prod_{j=1}^{n} \frac{P'(x^j | x^i = 1)}{P'(x^j | x^i = 0)} \frac{P'(X_1(i))}{P'(X_0(i))}.$$

11. The method of claim 10 wherein a log transformation of mapping functions is defined as:

$$\log z^i(x^1, \ldots, x^n) = \sum_{j=1}^{n} \frac{P'(x^j | x^i = 1)}{P'(x^j | x^i = 0)} + \log \frac{P'(X_1(i))}{P'(X_0(i))}.$$

12. A non-transitory computer readable storage medium tangibly storing computer program instructions capable of being executed by a computer processor, the computer program instructions defining the steps of:

receiving input data with categorical labels, the input data comprising vectors, and each categorical label denoting a subset of the vectors;

forming higher-order links for each subset of the vectors;

calculating, by the computing device, a higher-order transform for each attribute in each subset based on at least a portion of the higher-order priors by calculating a higher-order prior for each attribute in each subset, wherein each higher-order prior represents a probability corresponding to the associated attribute that is based on one or more patterns of occurrence of the attribute, wherein calculating a higher-order prior comprises estimating the higher-order prior by:

$$\hat{P}(x^i = 1 \mid X) = \frac{|\varphi(i, X)|}{|\Phi(X)|}, \text{ and } \hat{P}(x^i = 0 \mid X) = 1 - \hat{P}(x^i = 1 \mid X)$$

where $\Phi(X)$ denotes a set of higher-order links of a specified order in a dataset X, $\phi(i,X) \subseteq \Phi(X)$ denotes a subset of higher-order links that contain attribute i in dataset X, set $\phi(i,X)$ defines an event that a randomly chosen higher-order link contains attribute i, sets $\Phi(X)$ and $\phi(i,X)$ allow for characterization of each attribute i by a probability mass function $\hat{P}(x^i|X)$ defined over two events: presence of attribute i in a randomly chosen higher-order link, and an absence of that attribute from a randomly chosen higher-order link;

and transmitting transformed data to a learner to build a model.

13. The non-transitory computer readable storage medium of claim 12 wherein the transmitting transformed data to a learner further comprises transmitting transformed data to a generative learner.

14. The non-transitory computer readable storage medium of claim 12 wherein the transmitting transformed data to a learner further comprises transmitting transformed data to a discriminative learner.

15. The non-transitory computer readable storage medium of claim 12 wherein the transmitting transformed data to a learner further comprises transmitting transformed data to an unsupervised learner.

16. The non-transitory computer readable storage medium of claim 12 further comprising building a model using the transformed data.

17. The non-transitory computer readable storage medium of claim 12, further comprising determining a second higher-order transform, wherein corresponding conditional log likelihood ratios are defined as:

$$\phi_i^{(1)} = \log \frac{\hat{P}(x^i \mid X_j)}{\hat{P}(x^i \mid X_k)},$$

and $$\phi_i^{(0)} = \log \frac{1 - \hat{P}(x^i \mid X_j)}{1 - \hat{P}(x^i \mid X_k)},$$

where $C=\{c_1, \ldots, c_K\}$ denotes a set of categorical labels, two sets $X_j$ and $X_k$ of vectors are from subsets $c_j$ and $c_k$, respectively, and wherein each binary vector $x=(x^1, \ldots, x^n)$, $x \in X_j \cup X_k$, is then transformed into a real vector $\hat{x}=(\hat{x}^1, \ldots, \hat{x}^n)$, where $$\hat{x}^i = \begin{cases} \frac{\phi_i^{(1)}}{\sqrt{|\phi_i^{(1)}|}}, & \text{if } x^i = 1, \phi_i^{(1)} \neq 0 \\ \frac{\phi_i^{(0)}}{\sqrt{|\phi_i^{(0)}|}}, & \text{if } x^i = 0, \phi_i^{(0)} \neq 0 \\ 0, & \text{otherwise.} \end{cases}$$

18. The non-transitory computer readable storage medium of claim 12, further comprising determining a second higher-order transform, wherein each attribute i partitions a n-dimensional boolean space $X=\{0,1\}^n$ into two subspaces: $X_1(i)=\{x: x^i=1, x \in X\}$ and $X_0(i)=X \setminus X_1(i)$, wherein in each of subspaces $X_1(i)$ and $X_0(i)$, attribute i is represented as a probabilistic function of all attributes, this probabilistic function being defined over a space of higher-order links, and a second function unifies representations across subspaces $X_1(i)$ and $X_0(i)$, and produces a final transformation.

19. The non-transitory computer readable storage medium of claim 18 wherein the unifying function acts as a filter and prevents attributes that exhibit a same distribution in both subspaces $X_1(i)$ and $X_0(i)$ from influencing the transformation of attribute i.

20. The non-transitory computer readable storage medium of claim 19 wherein, given a set $\overline{X} \subset X$ of n-dimensional boolean vectors, two disjoint subsets determined by some attribute i are denoted as $X_1(i)=\{x:x^i=1, x \in \overline{X}\}$ and $X_0(i)=\overline{X} \setminus X_1(i)$, $\phi(i,X)$ denotes a subset of higher-order paths that contain attribute i in a dataset X, and $\Phi(X)$ denotes a set of higher-order paths in X, and a conditional higher-order probability mass function is defined as $$P'(x^i \mid x^1, \ldots, x^n) = \frac{P'(x^1, \ldots, x^n \mid X_{x^i}(i))P'(X_{x^i}(i))}{P'(x^1, \ldots, x^n)},$$

where higher-order probability $P'(X_{x^i}(i))$ of subset $X_{x^i}(i)$ is estimated by the ratio of number of higher-order paths in that subset, $$P'(X_{x^i}(i)) = \frac{|\Phi(X_{x^i}(i))|}{|\Phi(X_1(i))| + |\Phi(X_0(i))|}.$$

21. The non-transitory computer readable storage medium of claim 20 wherein naïve assumption of conditional independence of attributes given a value of attribute i is:

$$P'(x^1, \ldots, x^n \mid X_{x^i}(i)) = \prod_{j=1}^{n} P'(x^j \mid x^i),$$

where conditional higher-order probability mass function $P'(x^j|x^i)$ is estimated by $$P'(x^j = 1 \mid x^i) = \frac{|\varphi(j, X_{x^i}(i))|}{|\Phi(X_{x^i}(i))|}$$

since $P'(x^j=0|x^i)=1-P'(x^j=1|x^i)$, and the proposed transform is a non-linear mapping $Z=(z^1(x), \ldots, z^n(x)):\{0,1\}^n \to \Re^n$, from a n-dimensional boolean space X to a n-dimensional real space Z, where function Z maps each boolean attribute i to the real domain by a non-linear function $z^i(x^1, \ldots, x^n): \{0,1\} \to \Re^n$, and mapping functions $z^i$ are defined over a space of higher-order paths as $$z^i(x^1, \ldots, x^n) = \frac{P'(x^i = 1 \mid x^1, \ldots, x^n)}{P'(x^i = 0 \mid x^1, \ldots, x^n)}$$

$$= \prod_{j=1}^{n} \frac{P'(x^j \mid x^i = 1)}{P'(x^j \mid x^i = 0)} \frac{P'(X_1(i))}{P'(X_0(i))}.$$

22. The non-transitory computer readable storage medium of claim 21 wherein a log transformation of mapping functions is defined as:

$$\log z^i(x^1, \ldots, x^n) = \sum_{j=1}^{n} \frac{P'(x^j \mid x^i = 1)}{P'(x^j \mid x^i = 0)} + \log \frac{P'(X_1(i))}{P'(X_0(i))}.$$

\* \* \* \* \*

UNITED STATES PATENT AND TRADEMARK OFFICE
CERTIFICATE OF CORRECTION

| | | |
|---|---|---|
| PATENT NO. | : 8,572,071 B2 | Page 1 of 1 |
| APPLICATION NO. | : 12/797366 | |
| DATED | : October 29, 2013 | |
| INVENTOR(S) | : William M. Pottenger et al. | |

It is certified that error appears in the above-identified patent and that said Letters Patent is hereby corrected as shown below:

In the Specification

At Colum 1, Line number 14, enter the following:
STATEMENT REGARDING FEDERALLY SPONSORED RESEARCH
"This invention was made with government support under grant numbers 0703698 and 0712139 awarded by the National Science Foundation. The government has certain rights in the invention."

Signed and Sealed this
Third Day of October, 2023

Katherine Kelly Vidal
*Director of the United States Patent and Trademark Office*